US012597722B2

(12) United States Patent
Kidd

(10) Patent No.: US 12,597,722 B2
(45) Date of Patent: Apr. 7, 2026

(54) SYSTEM AND METHOD FOR CONNECTION MANAGEMENT IN DATA PROCESSING SYSTEM

(71) Applicant: Dell Products L.P., Round Rock, TX (US)

(72) Inventor: Owen Oliver Kidd, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 622 days.

(21) Appl. No.: 18/048,670

(22) Filed: Oct. 21, 2022

(65) Prior Publication Data

US 2024/0136743 A1 Apr. 25, 2024
US 2024/0235078 A9 Jul. 11, 2024

(51) Int. Cl.
*H01R 12/72* (2011.01)
*G06K 7/00* (2006.01)

(52) U.S. Cl.
CPC ........... *H01R 12/72* (2013.01); *G06K 7/0047* (2013.01)

(58) Field of Classification Search
CPC .............................. H01R 12/72; G06K 7/0047
See application file for complete search history.

(56) References Cited

U.S. PATENT DOCUMENTS 5,460,531 A * 10/1995 Vivio ................... H05K 7/1092
439/70
5,712,768 A * 1/1998 Werther ............... H05K 7/1084
361/767

| | | | | |
|---|---|---|---|---|
| 5,825,630 A * | 10/1998 | Taylor | .................... | H05K 7/023 |
| | | | | 361/791 |
| 7,698,095 B2 | 4/2010 | Chung et al. | | |
| 7,701,713 B2 | 4/2010 | Li | | |
| 7,848,115 B2 * | 12/2010 | Casto | ....................... | H05K 1/14 |
| | | | | 361/802 |
| 8,174,106 B2 * | 5/2012 | Coteus | ................... | H05K 3/325 |
| | | | | 257/723 |
| 8,182,319 B2 | 5/2012 | Ong et al. | | |
| 8,550,702 B2 | 10/2013 | Campbell et al. | | |
| 9,129,958 B2 | 9/2015 | Mallik et al. | | |
| 9,237,671 B2 | 1/2016 | Chen et al. | | |
| 9,820,411 B2 | 11/2017 | Alshinnawi et al. | | |
| 10,123,452 B2 | 11/2018 | Chen et al. | | |
| 10,177,107 B2 | 1/2019 | Camarota | | |
| 10,274,945 B2 | 4/2019 | Arensmeier et al. | | |
| 10,624,226 B1 * | 4/2020 | Alvarado | ............. | H05K 7/1408 |
| 10,709,032 B1 | 7/2020 | Holyoake et al. | | |
| 11,019,748 B2 | 5/2021 | Avvaru et al. | | |
| 11,064,808 B2 | 7/2021 | Chen et al. | | |

(Continued)

*Primary Examiner* — Timothy J. Dole

(74) *Attorney, Agent, or Firm* — WOMBLE BOND DICKINSON (US) LLP

(57) ABSTRACT

Methods, systems, and devices for providing computer implemented services are provided. The computer implemented services may be provided using hardware components of a data processing system. The hardware components may need to communication with one another to provide the computer implemented services. A data processing system may include a high speed connector assembly that may operably connect multiple hardware devices via cabling rather than through circuit card implemented transmission lines. The cabling may provide improved signal integrity and may reduce demand for circuit card area.

20 Claims, 8 Drawing Sheets

(56) References Cited

U.S. PATENT DOCUMENTS

| | | | |
|---|---|---|---|
| 11,129,293 B2 | 9/2021 | Wurmfeld | |
| 11,262,809 B2 | 3/2022 | Pham et al. | |
| 11,293,659 B2 | 4/2022 | Brahme et al. | |
| 11,320,164 B2 | 5/2022 | Roth | |
| 11,710,726 B2 * | 7/2023 | Hovis | H01L 23/66 |
| | | | 713/320 |
| 2001/0040203 A1 | 11/2001 | Brock et al. | |
| 2004/0184248 A1 * | 9/2004 | Alger | H05K 1/141 |
| | | | 361/777 |
| 2005/0250352 A1 * | 11/2005 | Maugars | G06K 7/0086 |
| | | | 439/50 |
| 2008/0101049 A1 * | 5/2008 | Casto | H05K 1/14 |
| | | | 361/788 |
| 2019/0150311 A1 * | 5/2019 | Mason | H05K 3/3436 |
| | | | 439/55 |
| 2024/0136743 A1 * | 4/2024 | Kidd | G06F 13/4282 |
| 2024/0235078 A9 * | 7/2024 | Kidd | H01R 12/72 |

* cited by examiner

SYSTEM AND METHOD FOR CONNECTION MANAGEMENT IN DATA PROCESSING SYSTEM

FIELD OF THE EMBODIMENTS

Embodiments disclosed herein relate generally to device management. More particularly, embodiments disclosed herein relate to device communication management.

BACKGROUND

Computing devices may store data and use stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
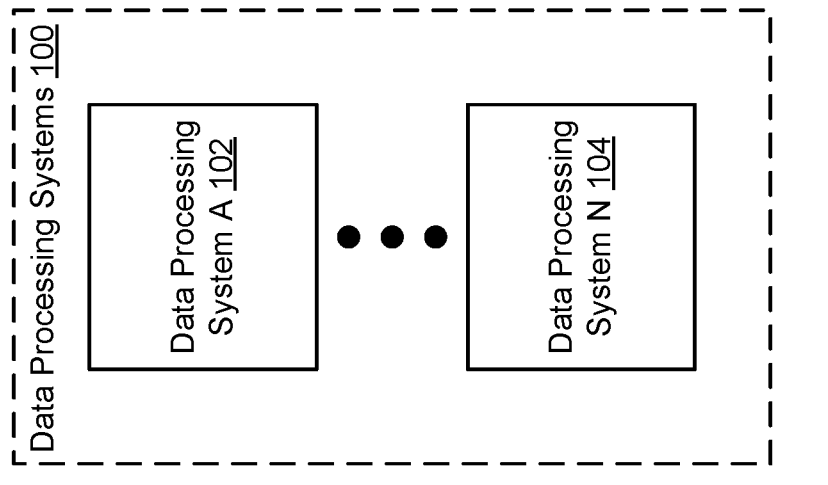
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices. In the context of mechanical device, "adapted to" may mean that the mechanical device is designed to perform a particular function and may include a shape, size, structure, components thereof, etc. to accomplish the function.

In general, embodiments disclosed herein relate to methods, systems, and devices for providing computer implemented services. The computer implemented services may include any quantity and type of such services, and may be provided by a data processing system.

The data processing system may include hardware components that provide the computer implemented services. To provide the computer implemented services, the hardware components (e.g., processors, storage devices, memory modules, etc.) may need to communicate with each other.

The data processing system may include a high speed connector assembly that facilitates communications between the hardware devices. The high speed connector assembly may utilize cables that may provide high signal integrity and facilitate increased components density through use of three dimension pathing of communications via the cables.

At least one of the hardware components may be positioned on a planar (e.g., a circuit card used to implement a mother board or other type of circuit card implemented device upon which various hardware components may be positioned). The high speed connector assembly may be positioned with the hardware component on the planar to facilitate launching of signals between the hardware component and other devices onto cables rather than onto communication lines positioned on the planar.

By doing so, the signals may be subject to reduced levels of degradation due to the signal integrity capabilities of the cables, and demand for area of the planar may be reduced. Thus, embodiments disclosed herein may address the technical problem of communications between hardware components being limited by circuit card based communications. Embodiments disclosed herein may address this problem by providing for inter-hardware devices via cabling rather than through circuit card based transmission lines.

In an embodiment, a data processing system that provides computer implemented services is provided. The data processing system may include a planar; a first socket positioned on a first side of the planar; a hardware component positioned in the first socket; a second socket positioned to mirror the first socket on a second side of the planar; a high speed connector assembly positioned with the second socket, the high speed connector assembly comprising: a circuit card comprising: first contacts to establish operable connections with a portion of pins of the second socket, the pins of the second socket carrying high speed signals generated by the hardware component, and second contacts to establish operable connections with sideband signals carried by the planar; and a connector operably connected to a portion of the first contacts and a portion of the second contacts; and a cable operably connected to the connector to carry a portion of the high speed signals and a portion of the sideband signals to a device of the data processing system.

The planar may include a sideband signal via positioned proximate to the second socket, wherein while the high speed connector assembly is positioned with the second socket, one of the second contacts is in contact with the sideband signal via to establish a portion of the operable connections with the sideband signals.

The sideband signal via may include a plated through hole portion and a pad positioned on the second side of the planar, and the one of the second contacts is in contact with the pad when establishing the portion of the operable connections with the sideband signals.

The circuit card may also include a first line operably connecting the connector and the pad; and a second line operably connecting the connector and a pin of the portions of the pins of the second socket.

The circuit card may include a socket area and an outpost area, and the socket area having lateral dimensions substantially the same as lateral dimensions of the second socket.

The outpost area may be positioned next to the socket area, and socket area may include pickup positioned on a first side of the circuit card, the first line being connected to the pickup, and the pickup being adapted to establish an electrical connection to the pad.

The first side of the circuit card may be facing the second socket while the high speed connector assembly is positioned with the second socket.

The data processing system may also include pickups corresponding to the portion of the pins, and isolation areas corresponding to other portions of the pins. The pickups may include conductive portions of the circuit card to establish electrical connections with the portions of the pins.

None of the pickups may be positioned in the isolation areas.

The isolation areas may include insulating portions of the circuit card to isolate the portion of the high speed signals from other portions of the pins of the second socket.

The other portions of the pins may carry power to power the hardware component.

The high speed signals may support operation of a communication bus, and the device communicates with the hardware component via the communication bus.

The communication bus may be a Peripheral Component Interconnect Express (PCIE) bus.

In an embodiment, a high speed connector assembly is provided, as described above.

Turning to FIG. 1, a block diagram illustrating a system in accordance with an embodiment is shown. The system shown in FIG. 1 may provide any quantity and type of computer implemented services. To provide the computer implemented services, the system of FIG. 1 may include data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may include any number of hardware components (e.g., processors, memory modules, storage devices, etc.). The hardware components may contribute computing resources used to provide the computer implemented services.

When providing the computer implemented services, the hardware components of the data processing systems may communicate with one another. To support communications between these components, the hardware components may be connected by a bus, communication links, and/or other type of channels for communication.

In general, embodiments disclosed herein relate to systems, devices, and methods for improving the likelihood that data processing systems 100 are able to provide their computer implemented services in a manner expected by the clients of the data processing system. To improve the likelihood that data processing systems 100 are able to provide their computer implemented services as expected by the clients, data processing systems 100 may include a communication framework that may have improved signal integrity. The improved signal integrity may reduce, for example, necessary retransmissions of information among hardware components.

Additionally, the communication framework may utilize three dimensional space for communications rather than substantially planar structures for communications (e.g., via circuit cards). By utilizing three dimensional space for communication, the hardware components of the data processing systems may be packed more densely, and the transmission distance between the hardware components may be reduced thereby reducing an overall footprint of the hardware components of the data processing system.

The communication framework may be implemented using a high speed connector assembly. The high speed assembly may be positioned proximate to a hardware component. When so positioned, the high speed connector may facilitate attachment of cabling near the hardware component. The cabling may connect to another hardware component thereby facilitating communications between the two hardware components without relying on planarized devices (e.g., without relying on two dimensional planar connections) to facilitate communications between hardware components at distances from each other. For additional details regarding a high speed connector assembly, refer to FIG. 2A.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via a communication system (not shown). The communication system may include one or more networks that facilitate communication between data processing systems 100 (or portions thereof) and/or other devices. The networks may include, for example, wired networks, wireless network, public networks, private network, the Internet, etc.

While illustrated in FIG. 1 as including a limited number of specific components, a system in accordance with an embodiment may include fewer, additional, and/or different components than those illustrated therein.

Figure 2A:
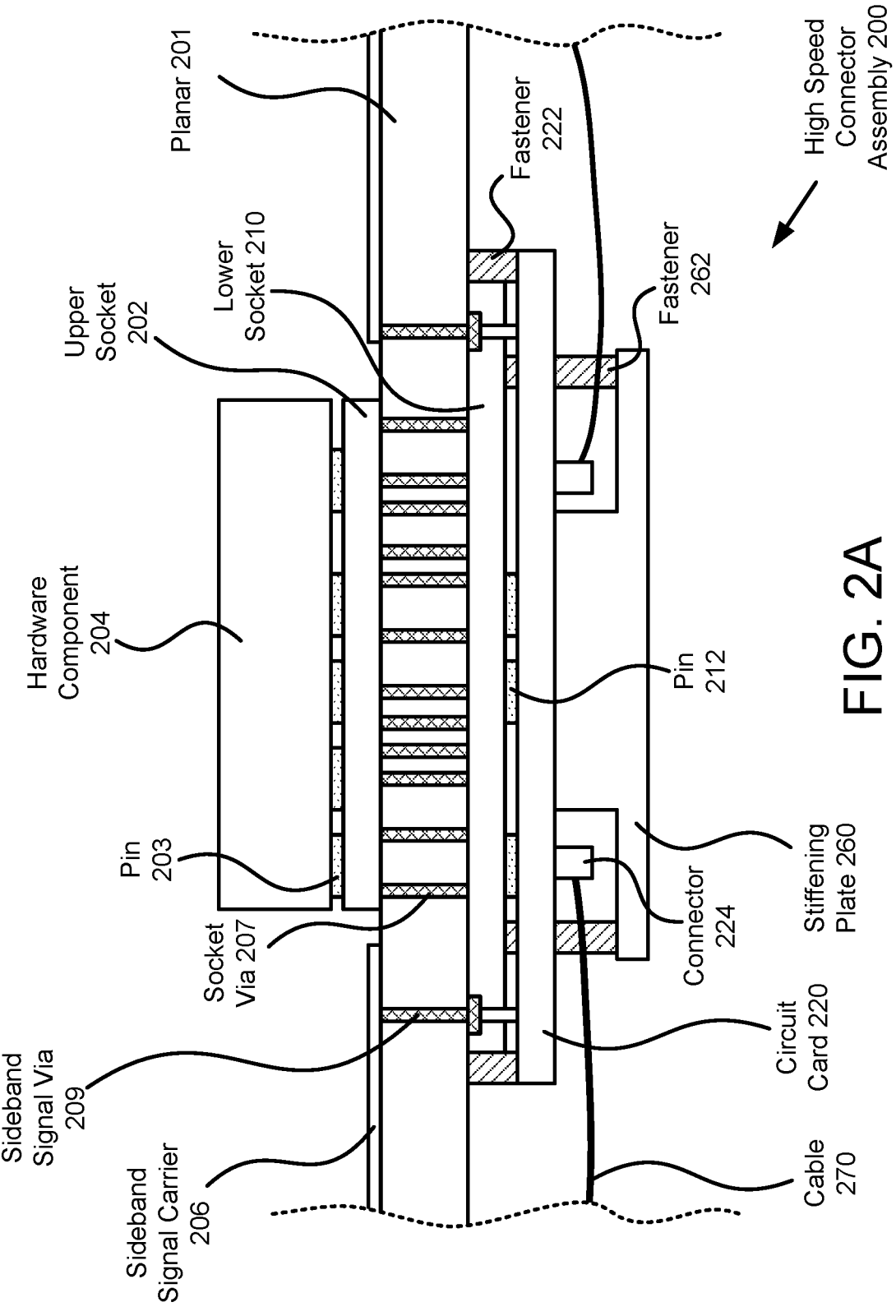
FIG. 2A shows a side view diagram of a high speed connector assembly in accordance with an embodiment.

As discussed above, data processing systems 100 may be implemented using a high speed connector assembly. Turning to FIG. 2A, a side view diagram of high speed connector assembly 200 of data processing system in accordance with an embodiment is shown.

To implement a data processing system, planar 201 may be used. Planar 201 may include conductive layers (e.g., metallization formed into traces, pads, etc.) and layers of insulation (e.g., sheets of dielectric, such as FR4) separating the conductive layers. Conductive vias may connect various portions of the conductive layers. The conductive layers may carry power and control signals to various hardware components positioned on planar 201. While described with respect to circuit cards, other structures such as connectors may be used to provide the functions of the circuit cards disclosed herein. For example, any of the circuit cards (e.g., 201, 220) may be replaced with a plastic (or other non-conducting material) connector that includes wiring. The connector may facilitate connection of the metal wiring to pins of sockets (e.g., 202, 210) to operably connect hardware components to other devices.

To position hardware components on planar 201, one or more sockets may be used. A socket may be a device that facilitates reversible attachment of hardware components to a circuit card. For example, upper socket 202 may be positioned on a side of circuit card 201, and may be electrically connected to various layers of metallization, vias, and/or other structures of planar 201. Upper socket 202 may also include pins (e.g., 203) usable to form operable connections with a hardware component (e.g., 204) positioned in upper socket 202. The pins may be conductive, may be connected to metallization of planar 201, and may be positioned to contact complementary structures of hardware components 204 (e.g., metal pads) to establish operable connections. Thus, hardware component 204 may be operably connected to planar 201 via upper socket 202.

To operate, hardware component 204 may need to obtain power and control signals, which may be supplied by planar 201. For example, planar 201 may include sideband signal carrier 206 (e.g., one or more traces or other types of structures formed with patterned conductive metallization and over which control signals flow) and/or sideband signal via 209 (e.g., a metallized via that facilitates access to sideband signal carrier 206 from either side of planar 201). Planar 201 may also include power distribution traces, pads, vias, etc. (not shown) to provide power to hardware component 204.

However, hardware component 204 may also need to communicate with other devices at high rates of communication to provide its functionality. Circuit cards that perform functions similar to planar 201 may be able to be shaped to facilitate high speed communications (e.g., by implementing microstrip transmission lines), but the resulting shapes of the circuit cards may provide communications with signal integrity levels insufficient for high speed applications, may consume large amounts of circuit card area because of the planar 201 the coplanar nature of the high speed communications pathway routing, and/or may otherwise be undesirable.

High speed connector assembly 200 may facilitate (i) communications between hardware component 204 and other devices via cables (e.g., 270) rather than using portions of planar 201, (ii) distribution of sideband and/or other control signals transported by planar 201 to the other devices via the cables, (iii) distribution of power carried by planar 201 to the other devices via the cables, and/or (iv) distribution of other types of electrical signals carried by planar 201 via the cables. By virtue of their structure, the cables may facilitate communications with improved signal integrity levels (e.g., may support a transverse electromagnetic magnetic wave rather than a degenerate mode such as quasi-transverse electromagnetic wave supported by microstrip/strip line transmission lines implemented with circuit cards and/or provide improved shielding of individual signal pairs through wires fully wrapped in grounded sheathes), and may free area of planar 201 for other purposes (i.e., other than high speed communications, circuit card implemented transmission lines which may occupy large amounts of space) thereby decreasing the footprint of the support structures necessary for hardware component 204 to operate and/or connect all functions.

High speed connector assembly 200 may include lower socket 210. Lower socket 210 may be similar to upper socket 202, but may be mirrored and on an opposite side of planar 201. The mirroring may be accomplished, for example, using any number of socket via 207 which may operably connect the landing pads on each side of planar 201 to which upper socket 202 and lower socket 210 may be connected. Consequently, similar pins of the sockets may provide access to similar signals. Thus, if a pin of upper socket 202 is connected to a pad of hardware component 204 that sends or receives high speed signals, then the corresponding pin of lower socket 210 may provide an operable connection to the pin/pad. Additionally, the instances of socket via 207 which do not carry signals or voltages relevant to connecting hardware component 204 to other devices may be back-drilled or otherwise excluded from the pin allocation on lower socket 210. Consequently, lower socket 210 may have fewer active pins (and/or the inactive pins may not be present) than the number of socket via 207.

Circuit card 220 may include a structure that operably connects various pins of lower socket 210 and sideband signal vias/pads of planar 201 to connectors (e.g., 224) to which cabling may be attached. The cabling may then be attached to a target device to facilitate high speed communications between hardware component 204 and the device, as well as facilitate transmission of control signals to the device (e.g., the control signals may be from any device, hardware component 204 and/or other devices such as a management controller).

Circuit card 220 may be connected to planar 201 via fastener 222. Fastener 222 may be any type of structure (e.g., a bolt, a machine screw, etc.) for reversibly securing circuit card 220 to planar 201. While not shown, planar 201 may include receptacles such as holes to facilitate securing of circuit card 220 to planar 201.

Connectors 224 may be any type of connector that may facilitate attachment of cabling to it. For example, connectors 224 may be implemented with various types of pin based (e.g., pin headers) connectors, edge connectors, surface mount connectors, protected circuit board connectors, and/or other types of connectors. Connectors may be adapted to operably connect to any type of cable (e.g., ribbon cables, coaxial cables, Peripheral Component Interconnect Express (PCIe) cables, Serial/Parallel-ATA cables, etc.)

Circuit card 220 may be implemented using dielectric layers with metallization, and/or other types of planarized signal distribution structures. Refer to FIGS. 2B-2F for additional details regarding circuit card 220.

Circuit card 220, sockets 202/210, and/or hardware component 204 may place stress on planar 201. To reduce the likelihood of planar 201 deforming and/or to improve the quality of electrical connections between various component, high speed connector assembly 200 may include stiffening plate 260. Stiffening plate 260 may be implemented using a plate and fasteners (e.g., 262) to secure it to planar 201. Stiffening plate 260 may carry some of the load from forces exerted on planar 201, thereby improving the likelihood of planar 201 maintaining its shape and/or electrical connection integrity.

Like fastener 222, fastener 262 may be implemented with any type of structure to secure stiffening plate 260 to planar 201 in a reversible manner. For example, fastener 262 may be implemented with a bolt and/or other structures as described similarly with respect to fastener 222.

When high speed connector assembly 200 is positioned with planar 201, high speed signals may be transmitted between hardware component 204 and a device operably connected to cable 270. Similarly, control signals (e.g., from a management controller connected to planar 201, not shown) may be transmitted to the device via cabling 270.

For example, a high speed signal (i.e., a high frequency content signal) may originate at hardware component 204. The high speed signal may traverse pin 203 to upper socket 202. The high speed signal may exit upper socket and traverse planar 201 along socket via 207 to reach lower socket 210. The high speed signal may traverse lower socket 210 and traverse pin 212 to reach circuit card 220 (and/or a connector that perform a function similar to circuit card 220, as noted above).

The high speed signal may then traverse (e.g. horizontally in FIG. 2A) along circuit card 220 until connector 224 is reached. The high speed signal may then exit connector 224 and traverse along cable 270 until the endpoint device is reached. A similar path may be used to relay a high speed signal back to hardware component 204.

In another example, a management controller (not shown, e.g., an in-band or out-of-band manager) positioned on planar 201 may originate a control signal. The management controller may be connected to sideband signal carrier 206 through which the control signal may traverse. After reaching sideband signal via 209, the control signal may traverse planar 201 through sideband signal via 209 to reach a pad on a bottom surface of planar 201 exposed to circuit card 220 and/or lower socket 210. Circuit card 220 may be operably connected to the pad and/or lower socket 210 thereby allowing the control signal to traverse to circuit card 220. Power and/or other types of signals transmitted along planar 201 may be picked up by circuit card 220 in a similar manner. Like the high speed signal, the control signal may traverse along circuit card 220 (e.g., following a trace or other conductive structure) until reaching connector 224. The control signal may then traverse cable 270 to reach the endpoint device. Thus, a connector (e.g., 224) of high speed connector assembly 200 may facilitate bundling of high speed signals, power, control signals, and/or other types of electrical signals carried by planar 201.

While described with respect to a circuit card, the functionality of connector 224 and circuit card 220 may be performed by a connector (e.g., plastic and metal structure). The connector may include conductors that attach to the pins (e.g., 212) of lower socket 210, the sideband signal vias (e.g., 209), and/or other power or signal carrying structures of planar 201. The connector may also connect to the cabling (e.g., 270) to the other devices. Like circuit card 220, the connector may include internally routed wires that facilitate aggregation of various signals into bundles that may be distributed to endpoint devices via the cabling.

While illustrated in FIG. 2A as including a limited number of specific components, a high speed connector assembly in accordance with an embodiment may include fewer, additional, and/or different components than those illustrated therein.

To further clarify aspects of high speed connector assemblies, bottom view diagram (with respect to FIG. 2A) of a high speed connector assembly in accordance with an embodiment are shown. In these figures, dashed wavy lines are used to indicate that the structures may continue on beyond the views shown herein.

Figure 2B:
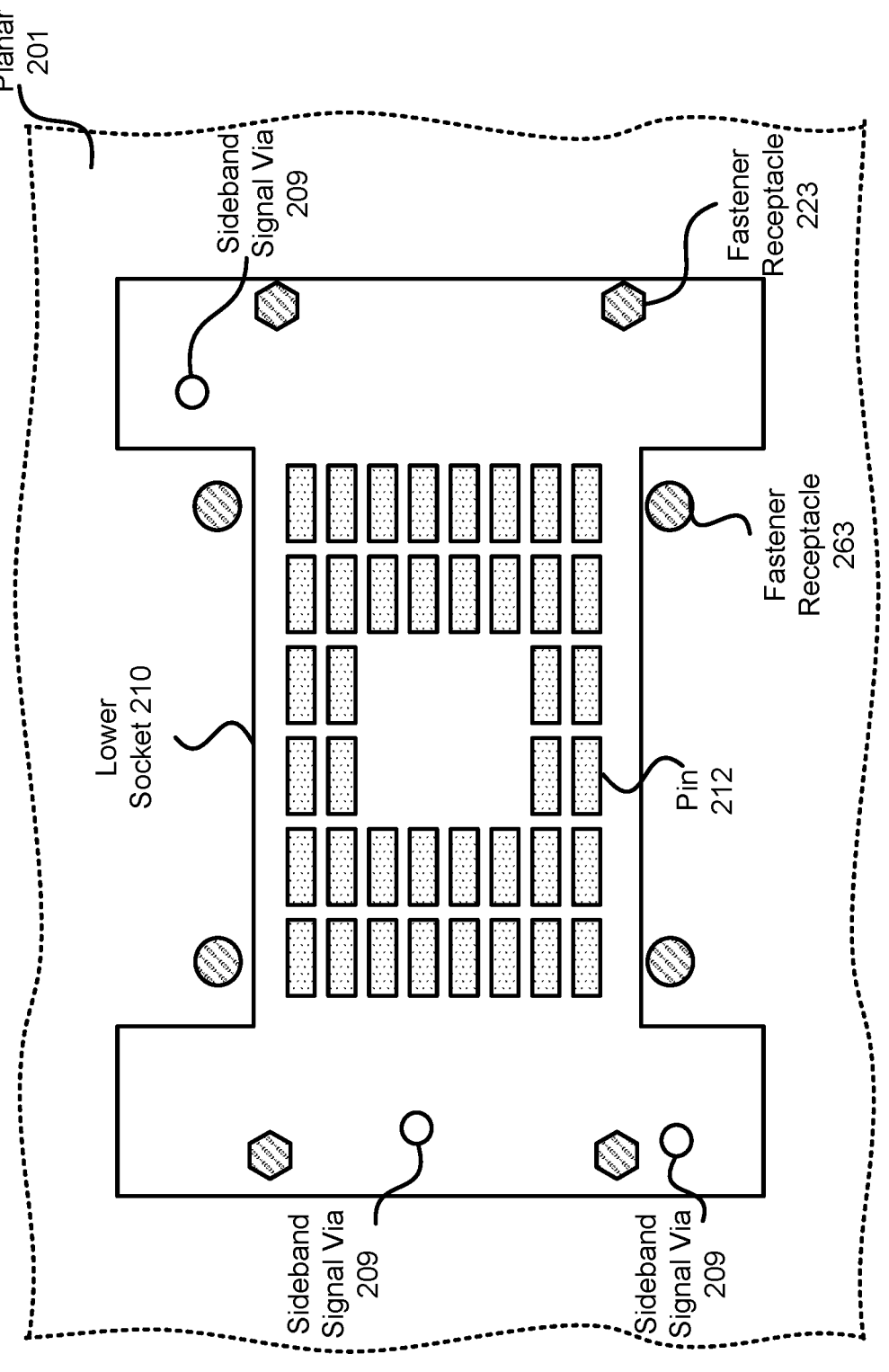
FIG. 2B shows a first top view diagram of a high speed connector assembly in accordance with an embodiment.

Turning to FIG. 2B, a first diagram of a high speed connector assembly in accordance with an embodiment are shown. In FIG. 2B, circuit card 220, stiffening plate 260, fastener 222, and fastener 262 are not shown.

As seen in FIG. 2B, circuit card may include various fastener receptacles 223, 263 (drawn with lined infill) corresponding to fastener 222 and fastener 262. The fastener receptacles may be implemented using holes in planar 201, or other structures that facilitate reversible attachment of circuit card 220 and stiffening plate 260 to planar 201. While illustrated in FIG. 2B using circles and hexagonal shapes, the fastener receptacles may have other shapes without departing from embodiments disclosed herein.

Additionally, as seen in FIG. 2B, any number of sideband signal via 209 may be present on planar 201. Consequently, one or more control signals may be obtained from the sideband signal vias. Likewise, pins 212 (drawn with dotted infill) of lower socket 210 (e.g., an electromechanical device, which may provide removable interface between an integrated circuit package and a circuit card with limited effect on signal integrity) may be connected to high speed signals (via socket vias not shown in FIG. 2B, may be below the pins), power, and/or other signals used by/generated by/required for operation of a hardware component in the upper socket 202 corresponding to lower socket 210.

Figure 2C:
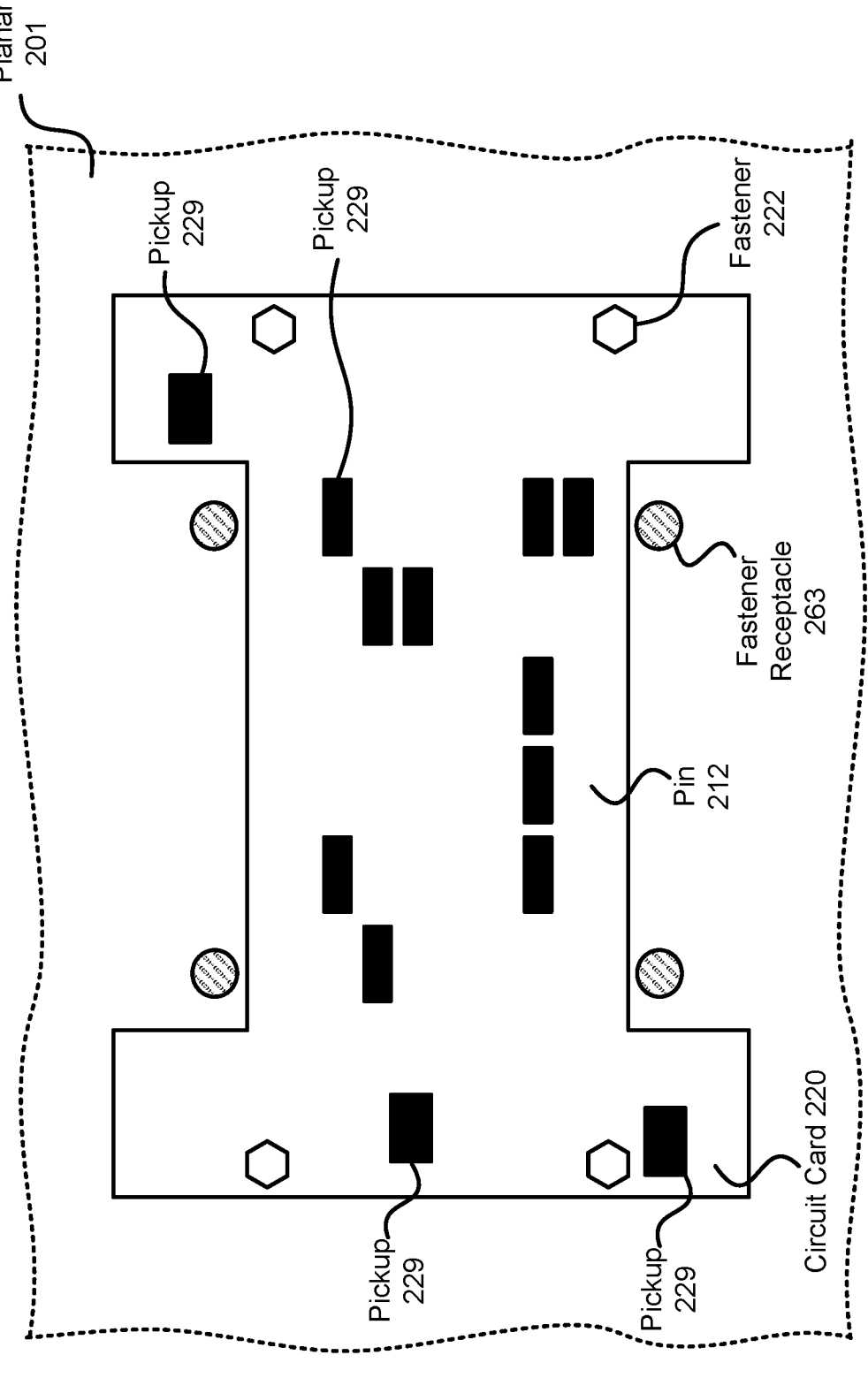
FIG. 2C shows a second top view diagram of a high speed connector assembly in accordance with an embodiment.

Turning to FIG. 2C, a second diagram of a high speed connector assembly in accordance with an embodiment are shown. The view in FIG. 2C may be similar to that of FIG. 2B. However, in FIG. 2B, features on a bottom surface of circuit card 220 may be shown.

As seen in FIG. 2C, circuit card 220 may include a number of pickup 229 on the bottom surface of circuit card 220. The pickups may be implemented with conductive structures (e.g., pads) that may establish electrical connections to portions of lower socket 210 and sideband signal vias (e.g., a pickup and a line, as described with respect to FIG. 2D being a contact 231 that provides electrical connectivity between a connector and a bottom portion of circuit card 220). The locations, shapes, and/or sizes of the pickups may correspond to those of the sideband signal vias and a portion of the pins of lower socket 210 that carry high speed signals.

For example, lower socket 210 may only include pins corresponding to socket vias carrying high speed signals, and/or the socket vias that are not carrying high speed signals may be back drilled or otherwise treated differently so that the signals that they carry are not propagated to socket 210, circuit card 220, etc. By doing so, the signal integrity of the high speed signals may be maintained and thereby directed to endpoint devices.

Other pins of lower socket 210 may carry power/control signals, which may be of much lower frequency thereby facilitating implementation of transmission lines for these signals via planar 201.

Additionally, when secured to planar 201, fastener 222 may retain circuit card 220 with planar 201.

Figure 2D:
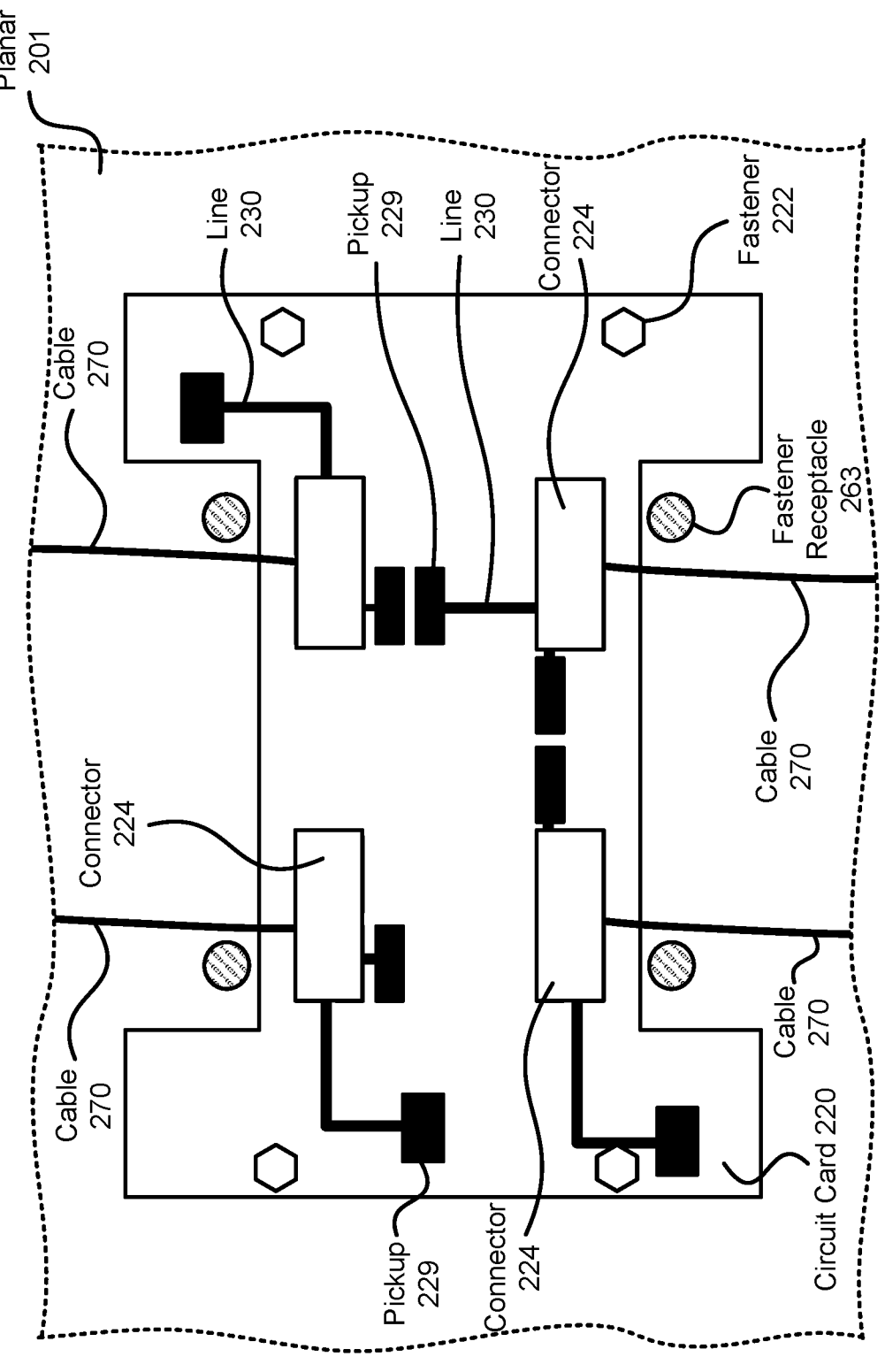
FIG. 2D shows a third top view diagram of a high speed connector assembly in accordance with an embodiment.

Turning to FIG. 2D, a third diagram of a high speed connector assembly in accordance with an embodiment are shown. The view in FIG. 2D may be similar to that of FIG. 2C. However, in FIG. 2D, features in and/or on top of circuit card 220 may be shown.

As seen in FIG. 2D, circuit card 220 may include connectors (e.g., 224) for reversible connection of cables (e.g., 270). Each of the connectors may be operably connected to some pickups via lines (e.g., 230). A line may be a conductive structure (e.g., a trace, a wire, etc.) that facilitates operable connection of a connector to a pickup.

Generally, the lines may route corresponding pickups that receive high speed signals corresponding to certain types of communications. For example, in the PCIe context, if a hardware component supports a 4× (i.e., 8-wire differential)

PCIe communication bus, then eight pickups (corresponding to the pins of the hardware components that supports the 4× PCIE communication bus) may be connected to a connector (e.g., 224) to establish a sufficient number of independent electrical connections between the hardware component (e.g., 204) and a target device (e.g., endpoint device) to provide for PCIE communications.

Additionally, the lines may route one or more control signals to a connector. Thus, the connector may, in addition to supporting a communication bus, also support management of the device connected via a cable (e.g., 270).

While illustrated in FIGS. 2A-2D as being directed along a surface of planar 201, cabling 270 may emanate from the connectors in different directions without departing from embodiments disclosed herein.

Figure 2E:
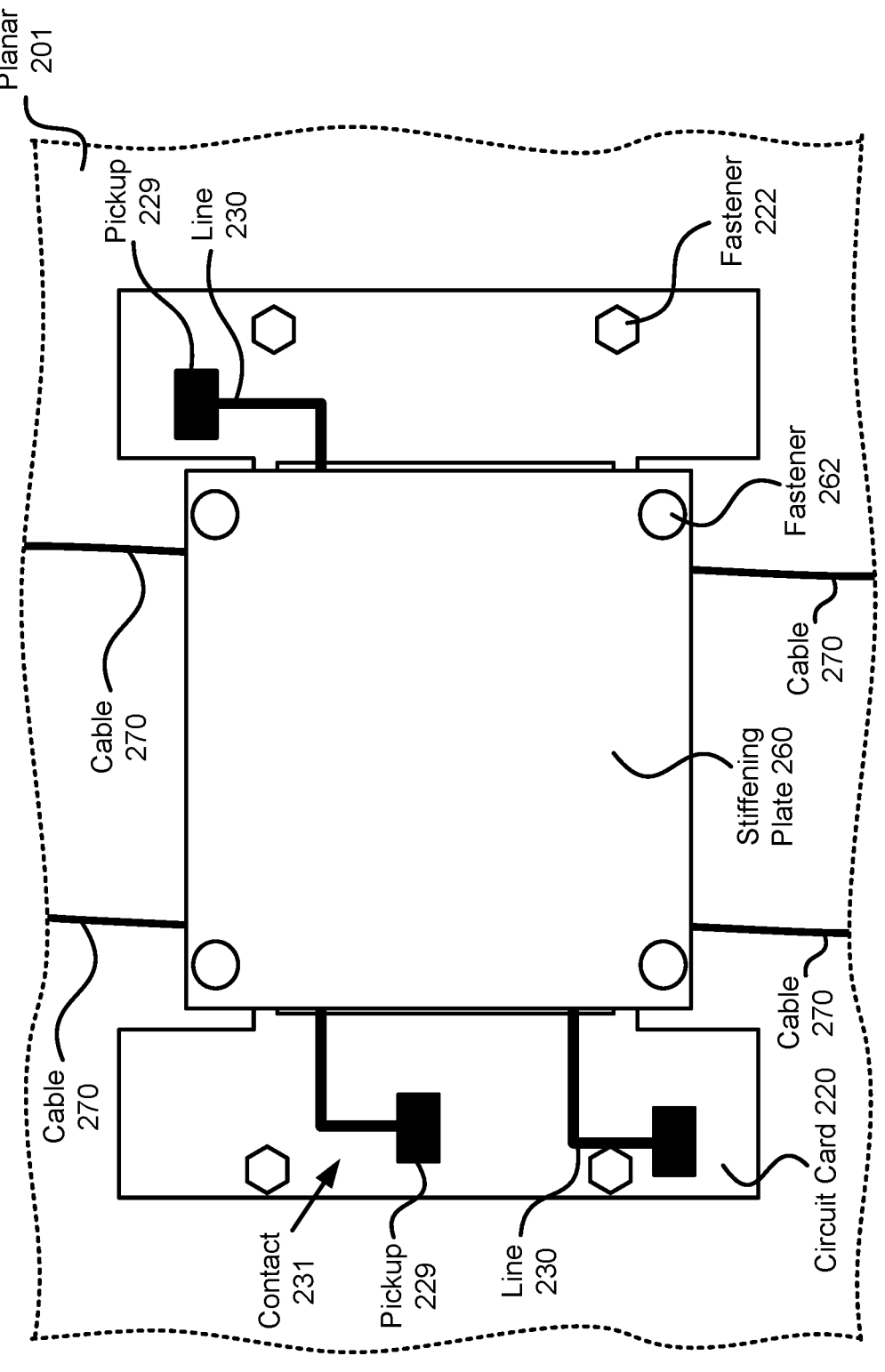
FIG. 2E shows a fourth top view diagram of a high speed connector assembly in accordance with an embodiment.

Turning to FIG. 2E, a fourth diagram of a high speed connector assembly in accordance with an embodiment are shown. The view in FIG. 2E may be similar to that of FIG. 2D. However, in FIG. 2E, stiffening plate 260 may be shown.

As seen in FIG. 2D, stiffening plate 260 may be connected to planar 201 via fastener 262. Fastener 262 may provide for a degree of compression of circuit card 220 against lower socket 210. The compression may improve the quality of electrical connections in the stack up of the circuit card, the lower socket, and the planar.

Additionally, as seen in FIG. 2D, stiffening plate 260 may only cover a portion of circuit card 220. For example, stiffening plate 260 may generally cover a socket area of circuit card 220 may be leave outpost areas uncovered.

Figure 2F:
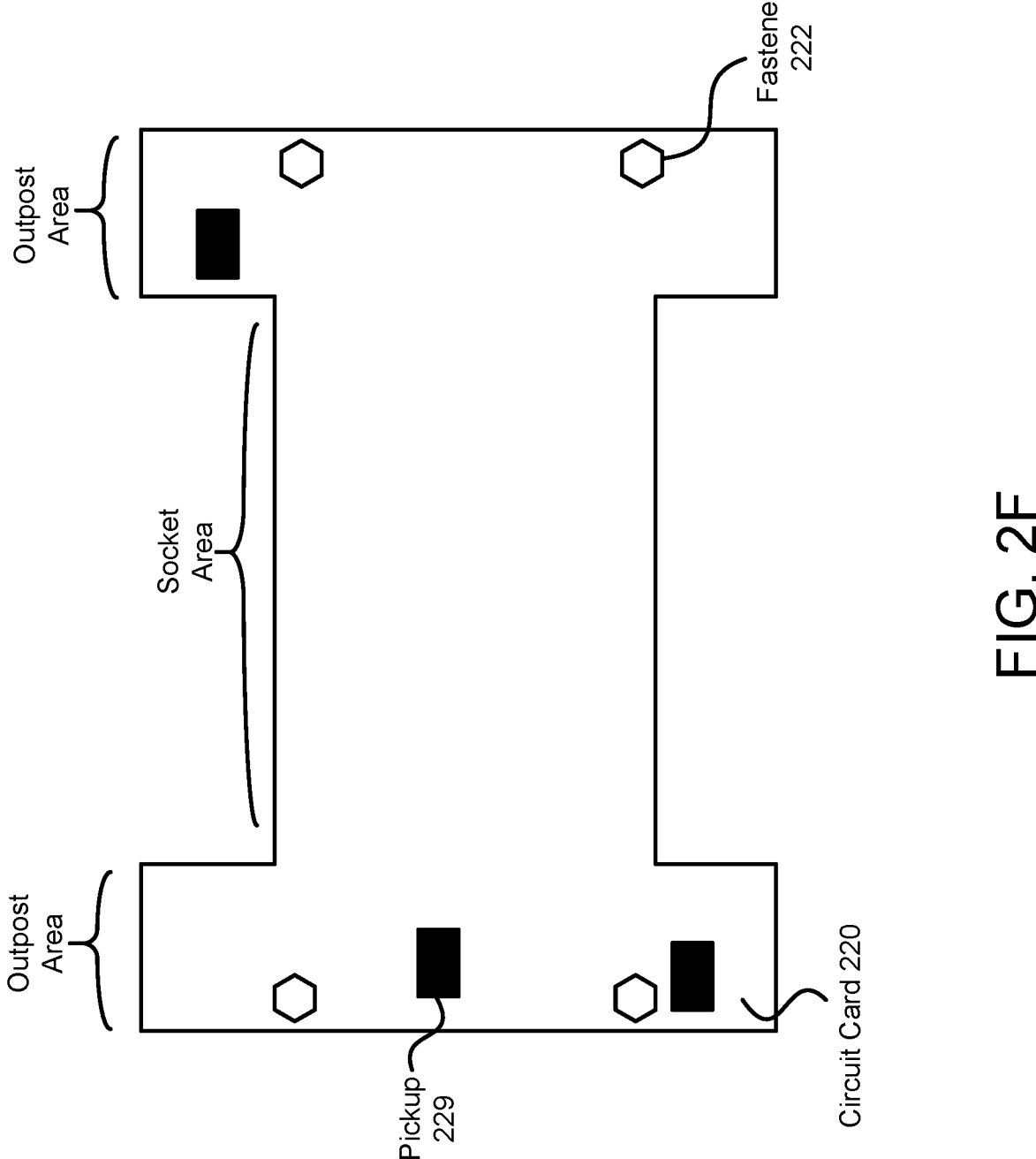
FIG. 2F shows a first top view diagram of a circuit card in accordance with an embodiment.

Turning to FIG. 2F, a diagram of circuit card 220 in accordance with an embodiment is shown. As seen in FIG. 2F, circuit card 220 may be divided into a socket area and outpost areas that may extend from the socket area. The socket area may correspond to the portion of circuit card 220 that mates with lower socket 210. In contrast, the outpost areas may extend from socket area to facilitate collection of sideband signals from other portions of planar 201. As seen in FIG. 2F, various pickups may be positioned in the outpost areas. The pickups in the outpost areas may pick up control signals, power, and/or other types of electrical signals (e.g., clock signals).

Thus, as illustrated in FIGS. 2A-2F, a data processing system may include a high speed connector assembly positioned on one side of a planar opposite of a hardware components (e.g., a processor) positioned on the planar. The high speed connector assembly may facilitate extraction of high speed signals and control signals, and place them on cables connected to devices. The cables may provide for high quality of signal integrity, and may traverse through three dimensional space. Consequently, a footprint of the data processing system may be reduced by virtue of the reduced need for two dimensional space of circuit cards being used for transmission of high speed signals and/or control signals coplanar to a planar between the hardware component and the device.

Figure 3:
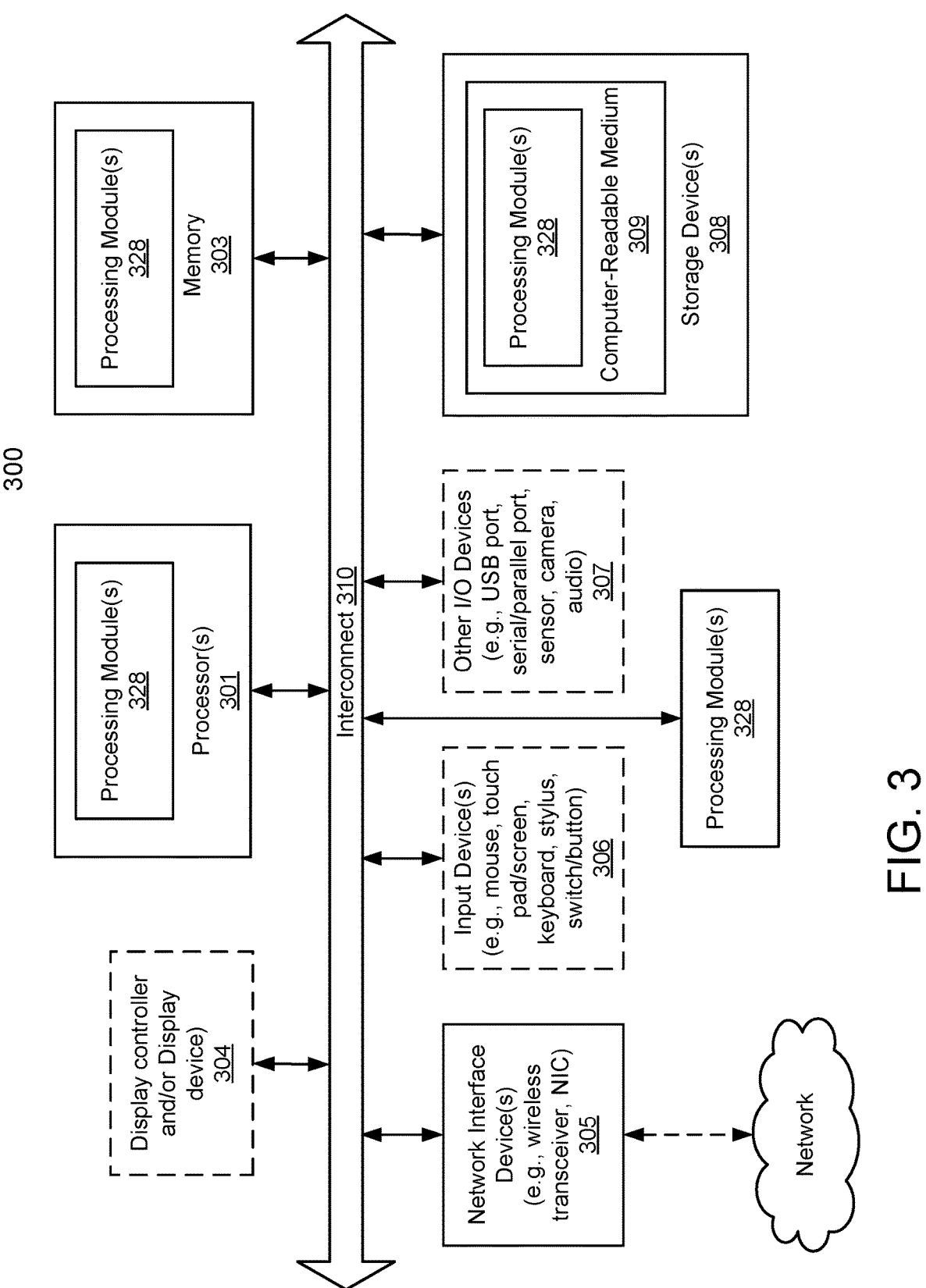
FIG. 3 shows a block diagram illustrating a computing device in accordance with an embodiment.

As discussed with respect to FIG. 1, data processing systems 100 may be implemented with computing devices. Turning to FIG. 3, a block diagram illustrating an example of a computing device in accordance with an embodiment is shown. For example, system 300 may represent any of the data processing systems and/or computing devices described above performing any of the processes or methods described above. System 300 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 300 is intended to show a high-level view of many components of the computer system. However, it is to be understood that additional components may be present in certain implementations and furthermore, different arrangement of the components shown may occur in other implementations. System 300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 300 includes processor 301, memory 303, and devices 305-330 via a bus or an interconnect 310. Processor 301 may represent a single processor or multiple processors with a single processor core or multiple processor cores included therein. Processor 301 may represent one or more general-purpose processors such as a microprocessor, a central processing unit (CPU), or the like. More particularly, processor 301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 301, which may be a low power multi-core processor socket such as an ultra-low voltage processor, may act as a main processing unit and central hub for communication with the various components of the system. Such processor can be implemented as a system on chip (SoC). Processor 301 is configured to execute instructions for performing the operations discussed herein. System 300 may further include a graphics interface that communicates with optional graphics subsystem 304, which may include a display controller, a graphics processor, and/or a display device.

Processor 301 may communicate with memory 303, which in one embodiment can be implemented via multiple memory devices to provide for a given amount of system memory. Memory 303 may include one or more volatile storage (or memory) devices such as random access memory (RAM), dynamic RAM (DRAM), synchronous DRAM (SDRAM), static RAM (SRAM), or other types of storage devices. Memory 303 may store information including sequences of instructions that are executed by processor 301, or any other device. For example, executable code and/or data of a variety of operating systems, device drivers, firmware (e.g., input output basic system or BIOS), and/or applications can be loaded in memory 303 and executed by processor 301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 300 may further include IO devices such as devices (e.g., 305, 306, 307, 308) including network interface device(s) 305, optional input device(s) 306, and other optional IO device(s) 307. Network interface device(s) 305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 306 may include a mouse, a touch pad, a touch sensitive screen (which may be integrated with a display device of optional graphics subsystem 304), a pointer device such as a stylus, and/or a keyboard (e.g., physical keyboard or a virtual keyboard displayed as part of a touch sensitive screen). For example, input device(s) 306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 307 may include an audio device. An audio device may include a speaker and/or a microphone to facilitate voice-enabled functions, such as voice recognition, voice replication, digital recording, and/or telephony functions. Other IO devices 307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 310 via a sensor hub (not shown), while other devices such as a keyboard or thermal sensor may be controlled by an embedded controller (not shown), dependent upon the specific configuration or design of system 300.

To provide for persistent storage of information such as data, applications, one or more operating systems and so forth, a mass storage (not shown) may also couple to processor 301. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 301, e.g., via a serial peripheral interface (SPI). This flash device may provide for non-volatile storage of system software, including a basic input/output software (BIOS) as well as other firmware of the system.

Storage device 308 may include computer-readable storage medium 309 (also known as a machine-readable storage medium or a computer-readable medium) on which is stored one or more sets of instructions or software (e.g., processing module, unit, and/or processing module/unit/logic 328) embodying any one or more of the methodologies or functions described herein. Processing module/unit/logic 328 may represent any of the components described above. Processing module/unit/logic 328 may also reside, completely or at least partially, within memory 303 and/or within processor 301 during execution thereof by system 300, memory 303 and processor 301 also constituting machine-accessible storage media. Processing module/unit/logic 328 may further be transmitted or received over a network via network interface device(s) 305.

Computer-readable storage medium 309 may also be used to store some software functionalities described above persistently. While computer-readable storage medium 309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 328, components and other features described herein can be implemented as discrete hardware components or integrated in the functionality of hardware components such as ASICS, FPGAs, DSPs or similar devices. In addition, processing module/unit/logic 328 can be implemented as firmware or functional circuitry within hardware devices. Further, processing module/unit/logic 328 can be implemented in any combination hardware devices and software components.

Note that while system 300 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system that provides computer implemented services, comprising:
a planar;
a first socket positioned on a first side of the planar;
a hardware component positioned in the first socket;
a second socket positioned to mirror the first socket on a second side of the planar;
a high speed connector assembly positioned with the second socket, the high speed connector assembly comprising:
a circuit card of smaller lateral dimensions than the planar, the circuit card comprising:
first contacts to establish operable connections with a portion of pins of the second socket, the pins of the second socket carrying high speed signals generated by the hardware component, and
second contacts to establish operable connections with sideband signals carried by the planar; and
a connector operably connected to a portion of the first contacts and a portion of the second contacts; and
a cable operably connected to the connector to carry a portion of the high speed signals and a portion of the sideband signals to a device of the data processing system.

2. The data processing system of claim 1, wherein the planar comprises a sideband signal via positioned proximate to the second socket, wherein while the high speed connector assembly is positioned with the second socket, one of the second contacts is in contact with the sideband signal via to establish a portion of the operable connections with the sideband signals.

3. The data processing system of claim 2, wherein the sideband signal via comprises a plated through hole portion and a pad positioned on the second side of the planar, and the one of the second contacts is in contact with the pad when establishing the portion of the operable connections with the sideband signals.

4. The data processing system of claim 3, wherein the circuit card further comprises:
a first line operably connecting the connector and the pad; and
a second line operably connecting the connector and a pin of the portions of the pins of the second socket.

5. The data processing system of claim 4, wherein the circuit card comprises a socket area and an outpost area, and the socket area having lateral dimensions substantially the same as lateral dimensions of the second socket.

6. The data processing system of claim 5, wherein the circuit card further comprises a second outpost area, the outpost area and the second outpost area not being a continuous area.

7. The data processing system of claim 6, wherein the outpost area is positioned next to the socket area, and socket area comprises:
a pickup positioned on a first side of the circuit card, the first line being connected to the pickup, and the pickup being adapted to establish an electrical connection to the pad.

8. The data processing system of claim 7, wherein the first side of the circuit card is facing the second socket while the high speed connector assembly is positioned with the second socket.

9. The data processing system of claim 1, wherein the circuit card comprises:
pickups corresponding to the portion of the pins, and
isolation areas corresponding to other portions of the pins,
wherein the pickups comprise conductive portions of the circuit card to establish electrical connections with the portions of the pins.

10. The data processing system of claim 9, wherein none of the pickups are positioned in the isolation areas.

11. The data processing system of claim 10, wherein the isolation areas comprise insulating portions of the circuit card to isolate the portion of the high speed signals from other portions of the pins of the second socket.

12. The data processing system of claim 9, wherein the other portions of the pins carry power to power the hardware component.

13. The data processing system of claim 1, wherein the high speed signals support operation of a communication bus, and the device communicates with the hardware component via the communication bus.

14. The data processing system of claim 1, wherein the first socket is directly attached to the planar and the second socket is directly attached to the planar.

15. A circuit card assembly, comprising:
a planar;
a first socket positioned on a first side of the planar, the first socket adapted to receive a hardware component;
a second socket positioned to mirror the first socket on a second side of the planar;

a high speed connector assembly positioned with the second socket, the high speed connector assembly comprising:

a circuit card of smaller lateral dimensions than the planar, the circuit card comprising:

first contacts to establish operable connections with a portion of pins of the second socket, the pins of the second socket being adapted to carry high speed signals generated by the hardware component while positioned in the first socket, and second contacts to establish operable connections with sideband signals carried by the planar; and a connector operably connected to a portion of the first contacts and a portion of the second contacts; and a cable operably connected to the connector to carry a portion of the high speed signals and a portion of the sideband signals to a device.

16. The circuit card assembly of claim 15, wherein the planar comprises a sideband signal via positioned proximate to the second socket, wherein while the high speed connector assembly is positioned with the second socket, one of the second contacts is in contact with the sideband signal via to establish a portion of the operable connections with the sideband signals.

17. The circuit card assembly of claim 16, wherein the sideband signal via comprises a plated through hole portion and a pad positioned on the second side of the planar, and the one of the second contacts is in contact with the pad when establishing the portion of the operable connections with the sideband signals.

18. The circuit card assembly of claim 17, wherein the circuit card further comprises:

a first line operably connecting the connector and the pad; and a second line operably connecting the connector and a pin of the portions of the pins of the second socket.

19. The circuit card assembly of claim 18, wherein the circuit card comprises a socket area and an output area, and the socket area having lateral dimensions substantially the same as lateral dimensions of the second socket.

20. The circuit card assembly of claim 19, wherein the circuit card further comprises a second outpost area, the outpost area and the second outpost area not being a continuous area.

\* \* \* \* \*